May 9, 1933.  C. V. LINDBLOOM  1,908,431
PRESSURE REDUCING VALVE
Filed May 17, 1930  2 Sheets-Sheet 1
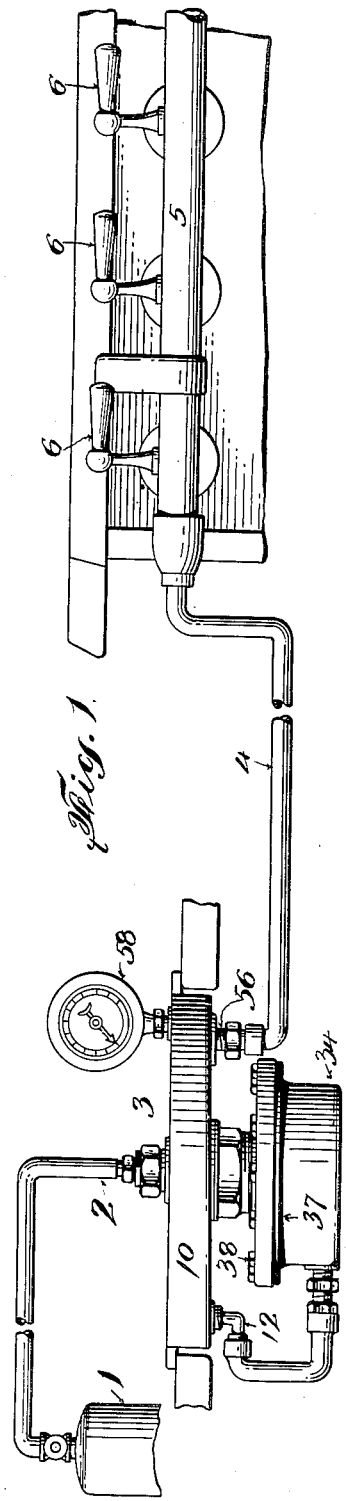
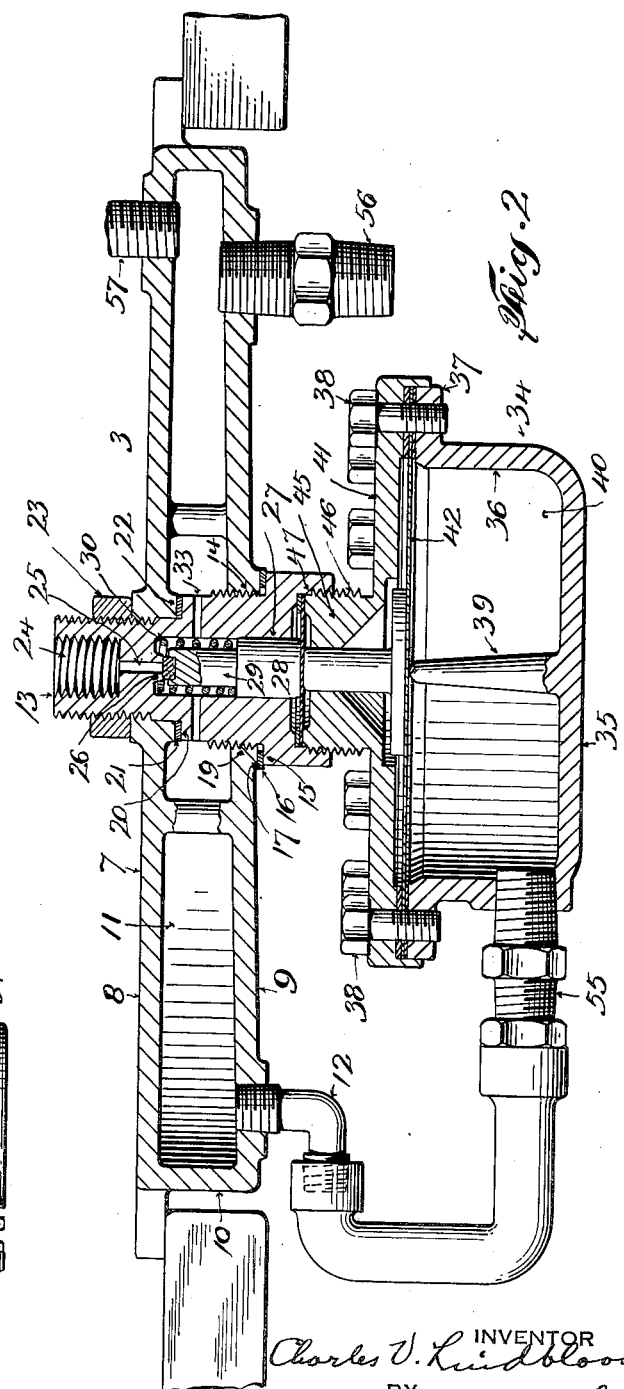
INVENTOR
Charles V. Lindbloom
BY
Charles G. Hensley.
ATTORNEY May 9, 1933.                C. V. LINDBLOOM                1,908,431
                         PRESSURE REDUCING VALVE
                           Filed May 17, 1930            2 Sheets-Sheet 2
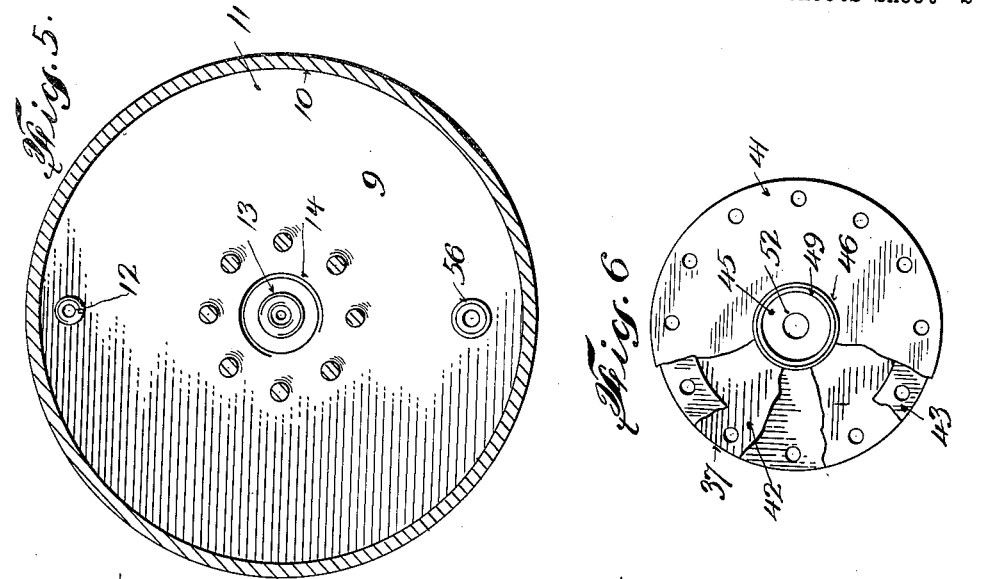
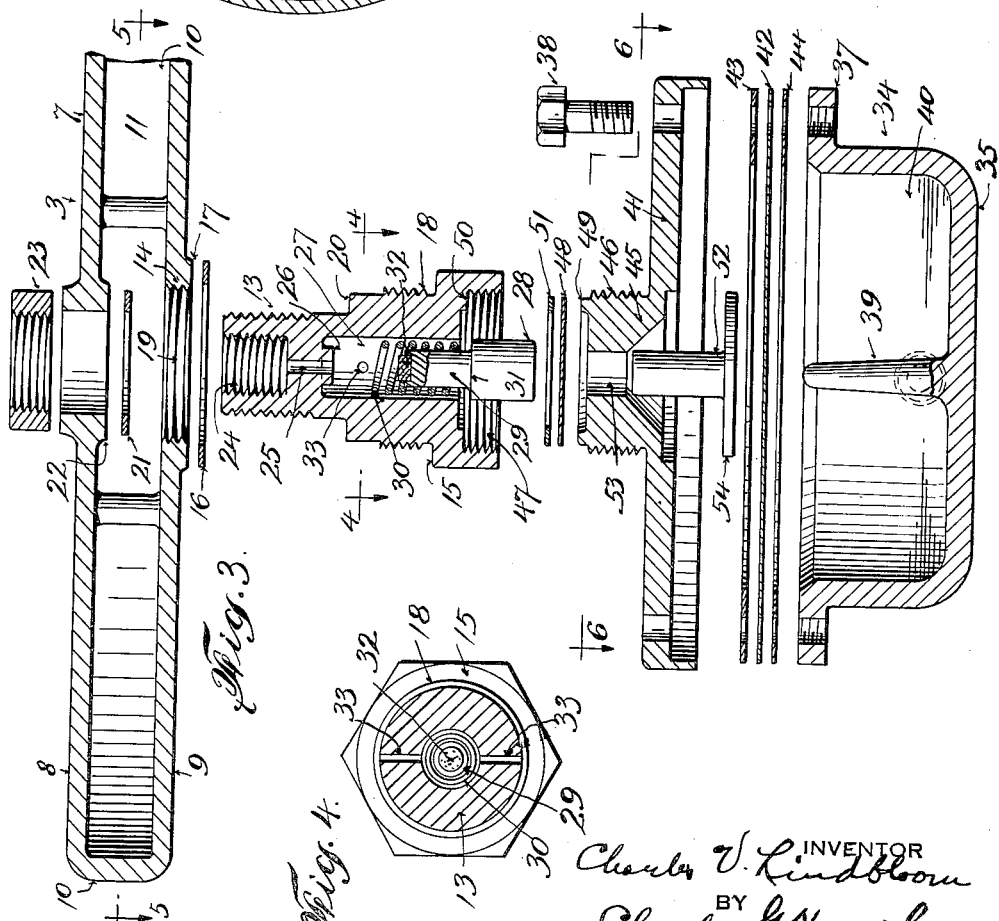

Patented May 9, 1933

1,908,431

UNITED STATES PATENT OFFICE

CHARLES V. LINDBLOOM, OF CRANFORD, NEW JERSEY, ASSIGNOR TO HI-HEAT GAS CO. INC., OF NEW YORK, N. Y., A CORPORATION OF NEW YORK

PRESSURE REDUCING VALVE

Application filed May 17, 1930. Serial No. 453,177.

My invention is applicable to many different uses and while I desire to be protected in all the uses of the invention, I have chosen to illustrate it in connection with a gas burning stove and from the illustrated embodiment it will be apparent to those skilled in the art how the invention may be applied or adapted for other uses. The function of a pressure reducing valve, where the same is used to control the supply of gas for burning and similar purposes, is to receive the gas from a source of supply at a relatively high pressure and to reduce the pressure preparatory to its consumption in a burner or other device. Heretofore, attempts have been made to use a diaphragm which is acted upon by the gas for the purpose of controlling the flow of gas through the valve in order to bring about a reduction or control of the pressure. In prior devices, however, the diaphragm would operate over a short period of time and then the gas would seep through and act on the reverse side of the diaphragm until a balance or substantial balance of pressures on both sides of the diaphragm rendered its action inefficient. When the valve of the gas burner or stove was turned off, a pressure was built up in the reducing valve and as a result a sudden rush of gas through the burner took place when the valve of the burner was opened for reigniting the gas.

The principal object of the present invention is to provide a reducing valve which will reduce the gas from a relatively high to a relatively low pressure and avoid the building up of pressure in the valve when the flow of gas is cut off.

Another object is to provide a pressure reducing valve which will operate efficiently when controlling the supply of gas to one or any greater number of burners. Heretofore it has been difficult, in fact impossible, to provide a reducing valve which would operate uniformly in controlling various numbers of gas burners. With the present invention it is possible to control the supply of gas to any number of burners and at the same time prevent the building up of excessive pressure in the reducing valve when one or any number of burners are shut off. The present device, therefore, may be used for controlling the supply of fuel to all parts of a gas stove, that is, to the oven burners, the open burners, as well as to any pilot light if desired.

Furthermore, the present valve may be used to reduce the pressure from a city gas main to supply the various gas stoves and other apparatus throughout a building, so that the gas may be distributed through a gas main at a much higher pressure than can be applied to the consuming apparatus and by reducing the pressure to that required at the points of consumption it makes it possible to reduce the cost of distributing gas in municipalities. As the cost of distribution is a large factor in the ultimate cost of the gas to the consumer, the present device makes it possible to multiply the distribution of gas in any system without increasing the present capacity of the mains.

With the present valve it is possible not only to reduce the pressure uniformly for one burner or for any greater number of burners up to the capacity of the device, and to reduce the pressure even below one pound per square inch where desired, but when the valve of the burner or valves of the burners are closed, thereby shutting off the consumption of the gas, there will be no appreciable building up of pressure within the reducing valve. Whereas in most previous devices the pressure, when consumption of the gas was discontinued, would build up to at least six to eight pounds, with the present device the building up of pressure under the same conditions is below one-half pound.

Another object of the invention is to provide a reducing valve wherein the gas, when entering the valve, is first expanded before it acts on the controlling diaphragm, and this permits of more perfect control of the valve action.

Another object is to provide a reducing valve which will be uniform or regular in its operation.

Another object is to provide a reducing valve which will positively shut off the supply of gas from the source of relatively high pressure automatically whenever the discharge of gas from the valve is shut off.

Another object of the invention is to provide a reducing valve which is simple in construction, inexpensive to manufacture, which will not get out of order or require constant regulation, and to provide a valve which will operate efficiently from its minimum to its maximum capacity.

Other objects and advantages will be set forth in the following detailed description of my invention.

In the drawings forming part of this application,

Figure 1 is an elevation of the improved reducing valve showing it connected with a source of supply and also with the manifold of a gas range, Figure 2 is a longitudinal sectional view through the center of the reducing valve, Figure 3 is a longitudinal sectional view showing the several parts of the valve separated, Figure 4 is a sectional view taken on the line 4—4 of Figure 3, Figure 5 is a sectional view taken on the line 5—5 of Figure 3, and Figure 6 is a sectional view taken on the line 6—6 of Figure 3.

In Figure 1 I have shown a source of supply of gas 1, which may be a tank or container charged under pressure with gas, or it may be a gas main through which gas is supplied from a municipal plant. Whatever the source of supply, the gas is conducted through the pipe 2 to the inlet of the reducing valve forming the subject of this invention, and which is generally designated by the numeral 3 in Figure 1. After passing through the reducing valve the gas is conducted by the pipe 4 to the point or points of consumption, and in the drawings I have shown this pipe connected with the manifold 5 of a gas range from which manifold gas may be supplied to a number of burners individually controlled by the valves 6 on the manifold. As indicated above, however, the gas conducted from the valve 3 through the pipe 4 may be used or consumed by any type of apparatus as far as the operation of the present invention is concerned.

The function of the present invention is to cause a uniform reduction in pressure in the gas which is received through the pipe 2 at a relatively high pressure and to discharge the gas through the pipe 4 at a much reduced pressure and to maintain a uniformly constant pressure through the discharge pipe 4 regardless of the pressure at which the gas is received through the pipe 2.

While the reducing valve may take various forms, I have, for simplicity, formed the same principally of two chambers, the upper one of which consists of a casting 7 having top and bottom walls 8, 9 arranged relatively close and of circular formation, together with a circular connecting wall 10 extending around and connected between the rims of the spaced walls 8, 9, so that these several walls form an expansion chamber 11 within which the gas may expand as it enters the reducing valve from the supply pipe 2. The walls 8, 9 are shown as converging, so that the spacing between them is greater on the side where the pipe 12 connects than on the side to which the pipe 4 is connected. There is a tubular member 13 which is inserted partly through the central aperture 14 in the lower wall 9 of the mixing chamber and it has a shoulder 15 which is adapted to press the gasket 16 against a boss 17 to provide a gas-tight connection between the member 13 and the mixing chamber. There is a threaded portion 18 on the member 13 which screws into the threaded aperture 19 of the mixing chamber. The upper portion of the member 13 is reduced in diameter to form a shoulder 20 and this shoulder presses a washer 21 against the boss 22 on the inner side of the mixing chamber wall 8 to form a gas-tight joint.

The upper, reduced end of this plug projects through and beyond the boss 22 and it is provided with a nut 23 on its projecting end which is adapted to draw the shoulder 20 into tight engagement against the washer 21. This end of the plug is provided with an internal thread 24 to receive the threaded connection of the pipe 2 which conducts the gas from the source of supply to the expansion chamber. The interior of the plug 13 is provided with a relatively small bore 25 in its upper portion which is in communication with the threaded bore 24 and at its lower end this smaller bore terminates in the center of a boss 26 which is formed in the plug member within the larger bore 27. Within the latter bore there is a plunger having a relatively larger portion 28 which fits the bore 27 but permits the plunger to move vertically therein without material resistance. The upper end of the plunger is reduced, as shown at 29, and there is a coiled spring 30 surrounding this portion of the plunger and compressed between the top wall of the bore 27 and between the shoulder 31 formed at the meeting of the relatively larger and smaller portions of the plunger. This coiled spring tends to move the plunger downwardly and it is so designed as to exert a definite downward pressure on the plunger. In a socket in the upper end of the plunger there is a gasket 32 adapted to seat against the boss 26 as a valve seat for the purpose of controlling the passage of gas from the small bore 25 in to the larger bore 27 or to shut off entirely the flow of gas at this point. The gas admitted through the bore 25 and into the bore 27 around the plunger is adapted to pass outwardly through the ports 33 into the large expansion chamber 11.

There is, preferably, a secondary chamber disposed below the main expansion chamber and this is shown as formed of a casting 34 having a bottom wall 35 and a cylindrical wall, the upper portion of the latter having a lateral flange 37 provided with a number of threaded apertures to receive bolts 38 therein. There is an upstanding post 39 which I have shown formed integral with the bottom wall 35 and the top of this post co-operates with the larger or main diaphragm, as will be hereinafter pointed out. The top or cover for the chamber 40 consists of a plate 41 extending across the open top of the casting 34 and it is adapted to be clamped to the flange 37 by means of the several bolts 38 which pass through apertures in the cover and screw into the threaded apertures in the flange 37. The relatively large diaphragm shown at 42 is clamped between the cover and the flange 37 around its periphery and washers 43, 44 are arranged on opposite sides of the outer portions of the diaphragms so that when the parts are assembled, as shown in Figure 2, a gas-tight connection is formed between the diaphragm and the casting 34 as well as the cover member 41. In the center of the cover there is an upwardly extending neck or boss 45 having an external thread 46 which screws into a threaded opening 47 in the lower end of the plug 13. A diaphragm 48 which is of relatively smaller diameter than the diaphragm 42 is clamped between the shoulder 49 on the boss 45 and the shoulder 50 on the interior of the plug 13, suitable washers 51 being disposed on opposite sides of the diaphragm to prevent gas from passing from one side thereof to the other.

The lower end of the plunger is adapted to engage one surface of the smaller diaphragm 48 while a co-operating plunger 52 which is slidable in the bore 53 of the boss 45 is adapted to engage at its upper end with the under or opposite side of the small diaphragm 48. This latter plunger is provided with an enlarged head 54 which rests on the upper surface of the large diaphragm 42 and the downward movement of this plunger is limited by the post 39 against which the large diaphragm rests at its center.

The pipe 12 is connected at one end to the wall 9 of the expansion chamber, so that its bore is in communication with the chamber 11 and this pipe connects with the nipple 55 which is threaded into the lower portion of the diaphragm chamber casting 34. The pipe 4 which conducts the gas under its reduced pressure to the manifold 5 of a gas stove or to any other apparatus adapted to consume the gas, is connected by the nipple 56 through the wall 9 of the expansion chamber, so that the gas will pass from this expansion chamber through the pipe 4 to the point or points of consumption. This nipple is preferably connected with the wall 9 at a point remote from the pipe 12 as is shown in Figure 2. I have shown a nipple 57 threaded through the upper wall 8 of the expansion chamber and to this is connected a gauge 58 which will show the pressure existing in the expansion chamber from time to time. This, it will be understood, is on the low pressure side of the reducing valve.

*Operation*

The reducing valve will be connected up between the source of supply or tank 1 by means of the pipe 2 and the expansion chamber containing the gas at reduced pressure is connected up by the pipe 4 with the manifold 5 of the gas stove or with any other apparatus which is to consume the gas supplied to it. The pipe 12 forms a means of communication between the expansion chamber 11 and the diaphragm chamber 40, these two being in free communication at all times through this connecting pipe. Let it be assumed that the device has been in operation so that in the expansion chamber 11 there is a supply of gas at low pressure say, by way of example, less than one pound per square inch. The same pressure will exist in the connecting pipe 12 and in the diaphragm chamber 40. This pressure in the diaphragm chamber will hold the larger diaphragm pressed upwardly against the plunger 52 and this latter plunger will, in turn, press upwardly against the under side of the smaller diaphragm 48 and the latter will press upwardly on the plunger 28, 29 so that the gasket 32 at its upper end will be seated against the valve seat 26 and prevent any gas from flowing from the source of supply beyond the gasket 32.

If one of the valves 6 on the manifold is opened to supply gas to a burner of a stove the gas flowing to the manifold through the pipe 4 will be taken from the expansion chamber 11 and this will reduce the pressure within the expansion chamber. This will also reduce the pressure within the pipe 12 and within the diaphragm chamber 40 so that the pressure on the under side of the larger diaphragm will decrease to a point where the plunger 28, 29 will move downwardly to some extent, according to how far the pressure in the expansion chamber is reduced.

The downward movement of this plunger 28, 29 will allow the central portion of the smaller diaphragm 48 to move downwardly with it in response to the downward pressure of the plunger 28, 29 which is urged by gravity and by the downward pressure of the spring 30. As the plunger 28, 29 moves downwardly it partially unseats the gasket 32 from the valve seat 26 and this allows gas from the high pressure side to pass from the port 25 into the bore 27 and from there the gas passes through the lateral ports 33 into the expansion chamber 11 where it undergoes expansion and replaces the gas which is withdrawn through the pipe 4 by the burner. If an additional valve 6 in the manifold is opened the gas will be withdrawn from the expansion chamber 11 at a greater rate and this will cause the gasket 32 to be unseated from the valve seat 26 to a greater extent, so that the flow of gas from the source of supply will be greater in order to make up for the more rapid withdrawal of the gas from the expansion chamber. Whether one or more valves in the manifold are opened, the pressure within the expansion chamber 11 will be maintained practically uniform because the plunger 28, 29 will admit sufficient fluid to the expansion chamber to make up for that which is withdrawn from the latter to the manifold. This holds true whether one burner in the stove is consuming gas or two, three or any number, up to the capacity of the device.

There will be a momentary slight increase in the expansion chamber 11 and this will act through the pipe 12 on the gas in the diaphragm chamber 40 and exert an upward pressure on the under side of the diaphragm 42, thereby lifting the plunger 52, the central portion of the smaller diaphragm 48, the plunger 28, 29, and this will move the gasket 32 toward the valve seat 26 and decrease the flow of gas from the source of supply to the expansion chamber so that the pressure within the expansion chamber becomes the same as before the valve in the manifold was closed. This operation follows whenever one or any number of the valves in the manifold are closed, so that the flow of gas from the supply into the expansion chamber takes place in accordance with the consumption of the gas. If all of the valves in the manifold are closed, the upward pressure on the under side of the large diaphragm will hold the gasket 32 seated against the valve seat 26, so that there will be no further flow of gas from the source of supply into the expansion chamber until one of the valves in the manifold is again opened.

It will be noted that gas pressure exists and acts only on the lower surface of the larger diaphragm 42 because any gas within the bore 27 cannot leak through to the upper side of the larger diaphragm because the smaller diaphragm 48 with its gas-tight washers prevents any gas from leaking or seeping through to the bore 53 below the smaller diaphragm. The upper side of the larger diaphragm is, therefore, at atmospheric pressure, so that no gas pressure can build up on the upper side of the larger diaphragm and balance the pressure which is applied to its under side by reason of gas in the compartment 40.

For this reason there is no possibility of the gas leaking or seeping through and affecting the upper side of the larger diaphragm. This prevents a balance from being established on the larger diaphragm and interfering with its accurate operation.

It is preferable to employ the second or supplementary chamber 40 associated with the large diaphragm with a pipe connected between this chamber and the primary expansion chamber rather than to mount the larger diaphragm in the wall of the primary expansion chamber.

As stated herein, the present device automatically maintains a uniform low pressure in the expansion chamber 11 regardless of how many burners are consuming gas taken from the expansion chamber up to the maximum capacity of the device. It will also be apparent that when all of the valves of the manifold or other apparatus which is consuming the gas, are closed, the gasket 32 is positively seated on the seat 26 and no gas passes into the expansion chamber until the gas consuming apparatus is again operated. Even where the expansion valve remains closed for a long period of time, the gauge 58 shows that there is no appreciable building up of pressure within the expansion chamber 11. The central post 39 forms an abutment for the central portion of the large diaphragm at a point when the gasket 32 is fully unseated from the valve seat 26 in order to prevent any excessive strain on either of the diaphragms. The pressure of gas maintained in the expansion chamber 11, in the embodiment of my invention shown herein, will depend on the strength of the coiled spring 30 and while this spring may be made adjustable, I prefer to use a spring of fixed strength in order that the user of the valve will not be able to regulate the action of the valve.

A spring of given strength used in the valve will cause a given gas pressure to be maintained in the expansion chamber. If it is desired to have a different gas pressure maintained in the expansion chamber, a spring 30 of different strength will be substituted. It is the upward pressure of gas on the under side of the larger diaphragm acting against gravity and the resistance of the spring 30 which determines the pressure which is maintained within the expansion chamber 11.

While I have described in great detail one embodiment of my invention, I desire it to be understood that the invention may be embodied in other forms and that I desire to cover all forms coming within the scope of the following claims.

It will be apparent that two of the valves shown and described herein may be arranged to operate in series so that the pressure of the fluid is reduced in stages and it will be apparent to those skilled in the art that this may be done wherever it is desirable.

Having described my invention, what I claim is:

1. The combination of a reducing valve comprising a casing having a port to receive fluid from a source of supply under pressure, of an expansion chamber into which the fluid passes after passing through said port, a valve for controlling the admission of fluid from a source of supply through said port, a diaphragm in said expansion chamber arranged to be acted upon on one side directly by the fluid in said expansion chamber to flex the same, means actuated by said diaphragm and operating to close said valve against the fluid pressure from the source of supply, and a second diaphragm arranged to serve as a packing to prevent the fluid escaping past said valve closing means, said second diaphragm being substantially isolated from direct action of the fluid thereon.

2. The combination of a reducing valve comprising a casing having a port to receive fluid from a source of supply under pressure, an expansion chamber receiving fluid after it has passed through said port, a valve for controlling the admission of fluid from the source of supply through said port and into said expansion chamber, a second expansion chamber and means for admitting fluid from said first into said second expansion chamber, a diaphragm in said second expansion chamber arranged to be acted upon on one side by the fluid in said second expansion chamber to flex the same, means actuated by said diaphragm and operating to close said valve against the pressure from the source of supply, and a second diaphragm arranged to serve as a packing to prevent the fluid from said first expansion chamber passing said valve operating means.

3. The combination of a reducing valve comprising a casing having a port to receive fluid from a source of supply under pressure, an expansion chamber receiving fluid after it has passed through said port, a valve for controlling the admission of fluid from a source of supply through said port and in to said expansion chamber, a second expansion chamber and means for admitting fluid from said first into said second expansion chamber, means remote from said fluid admitting means for withdrawing fluid for consumption from said first expansion chamber, a diaphragm in said second expansion chamber arranged to be acted upon on one side by the fluid therein and means actuated by said diaphragm for closing said valve and operating against the pressure from the source of supply.

Signed at the city, county and State of New York the 13th day of May 1930.

CHARLES V. LINDBLOOM.